INVENTOR
WERNER R. BAUER

BY

Robert R. Candor

HIS ATTORNEY

INVENTOR
WERNER R. BAUER
BY
Robert R. Candor
HIS ATTORNEY

Dec. 13, 1966 W. R. BAUER 3,291,923

SEQUENTIAL TIMER HAVING PROGRAM DISC WITH HIGH AND LOW POWER SWITCHING MEANS

Filed May 1, 1962 6 Sheets-Sheet 3

INVENTOR
WERNER R. BAUER

BY Robert R. Cauder

HIS ATTORNEY

INVENTOR
WERNER R. BAUER

BY
Robert R. Lauder
HIS ATTORNEY

INVENTOR
WERNER R. BAUER

BY

Robert R. Candor

HIS ATTORNEY

INVENTOR
WERNER R. BAUER

BY Robert R Candor
HIS ATTORNEY

United States Patent Office 3,291,923
Patented Dec. 13, 1966

3,291,923

SEQUENTIAL TIMER HAVING PROGRAM DISC WITH HIGH AND LOW POWER SWITCHING MEANS

Werner Robert Bauer, Columbus, Ohio, assignor to Robertshaw Controls Company, a corporation of Delaware Filed May 1, 1962, Ser. No. 191,509
12 Claims. (Cl. 200—38)

This invention relates to a timer for controlling a variety of operations.

For example, the timer may control the various operations or sequences of an automatic domestic washing machine and the like.

The timer of this invention may include a program disc or plate of electrically insulating material having nonconductive disc sides with program electrical conductors attached to such sides. A reader member may be provided with flexible electrical conductors or wires slantingly directed into contact with the disc sides.

The reader member may be provided with insulating conductor supports for the flexible conductors, and these supports may be floatingly mounted with respect to the disc and/or vice versa, to insure proper electrical contact with the program conductors on the disc.

The fingers or conductors of the reader straddle both faces of the disc and are biased toward each other due to their angular position in such a manner that substantially equal and balanced pressure is provided between the reading fingers and the disc or card. A substantial contact pressure can be applied by the reading fingers or wires on the surface circuits of the disc without unduly biasing the disc sidewise.

The floating relationship of the reader and the disc or card, in combination with the opposed, flexible and angular relationship of the reading conductors enable relatively strong contact pressure to be applied to the disc without producing any substantial sidewise distortion of the disc or reader.

The timer may be provided with wiping contacts to engage the program contacts on the disc or plate to control the flow of relatively weak currents to various weak current consuming devices. The timer also is provided with strong current carrying non-wiping contacts on relatively contactable conductors, and these non-wiping contacts may be moved toward and away from each other by a program irregularity on the disc or plate to make or break strong currents supplied to strong current consuming devices, such as motors, or the like.

The program disc may be provided with ratchet teeth driven by a spring loaded pawl in which the spring is loaded while the pawl is moved relatively slowly in ratcheting direction and is moved suddenly when said spring is released for unloading.

A flat plate may be provided with stationary contacts on its surfaces to conduct the current from the flexible reading conductors to a plurality connector terminals conveniently and efficiently arranged such as along the edge of said flat plate for easy connection of the timer with the various members to be controlled by said timer.

The timer may also include manipulating means in the form of an actuatable knob and the like which may be moved rotatably to select any one of a plurality of working programs, and may be moved axially to start the washing machine at the beginning or at any other stage of a selected program.

For example, the knob may be pulled toward the user and then rotated to select the beginning or any other stage of any desired program. Then the knob may be pushed away from the user simultaneously to start the selected operation and to disengage the knob from the timer. The selected program cannot then be disturbed by rotation of the knob unless it is first pulled toward the user. This prevents children from disturbing the selected washing program by merely turning the knob.

Accordingly, it is an object of this invention to provide a timer having one or more of the features of this invention herein disclosed.

Another object of this invention is to provide a method of timing having one or more features of this invention herein disclosed.

Other objects of this invention are apparent from this description, the appended claimed subject matter, and/or the accompanying drawings, in which:

Figure 1:
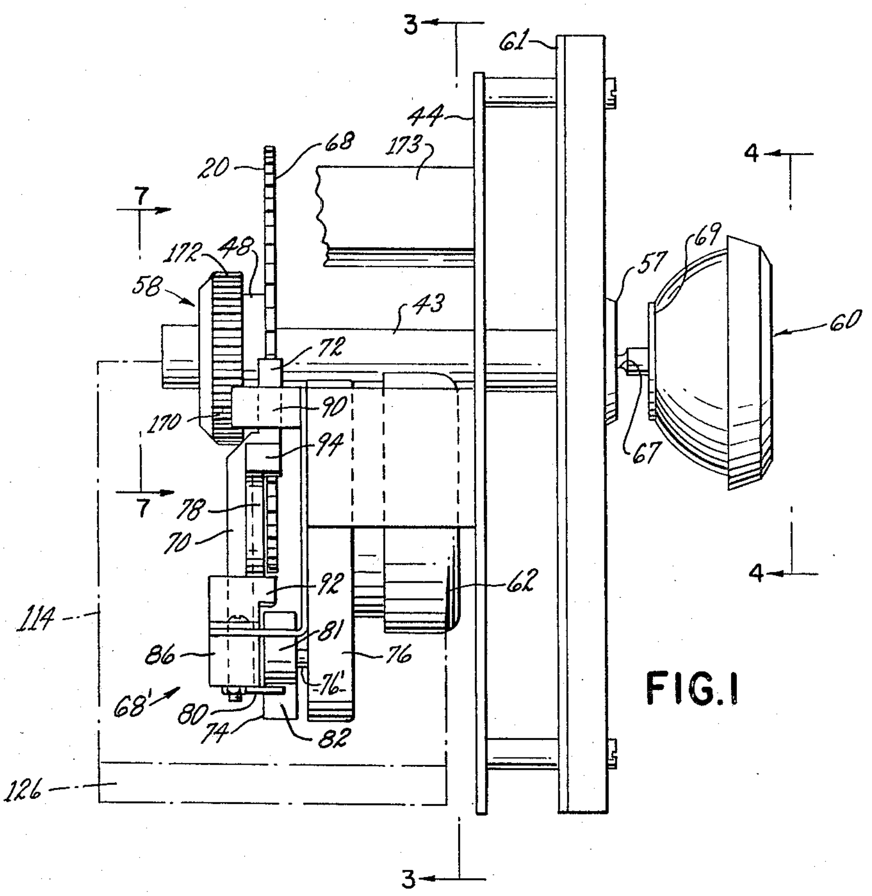
FIGURE 1 is an elevation of an embodiment of this invention, with parts omitted, and taken from the plane 1—1 of FIGURE 3.

Certain words indicating direction, relative position, etc., are used herein for the sake of clearness and brevity. However, it is to be understood that such words apply only to the specific disclosure in the drawings and that the actual devices may have entirely different direction, relative position, etc. Examples of such words are "upper," "lower," "vertical," "downward," "horizontal," etc.

A disc 20 may be made of electrically insulating material which has electrically non-conductive disc sides 22.

Ribbon-like, program electrical conductors 24 may be printed on each side of the disc 20. A reader member 26 has flexible electrical conductors or wires 28 (of coin silver or other suitable alloy) which are slantingly directed toward and biased into contact with the disc sides 22.

The disc 20 and the plate 114 may be provided with "printed" electrical circuits. That is, the main body of the disc or plate may be made of electrically insulating material with two opposite electrically insulating surfaces. Either one or both of these surfaces may be coated with a layer of film of electrically conducting material, such as copper, a copper alloy and the like. The copper coating may be covered with silver plating. Thereafter, the electrically conducting film may be covered or printed with a protective cover with a circuit design where it is desired to form a conductive circuit or pattern. The remaining unprotected coating is then removed or etched by acid and the like, leaving the ribbon-like printed circuits 24 which are to be contacted or read by the conductors 28.

The reader member 26 has conductor supports 30 of insulating material, and these conductor supports are placed on both sides of the disc. The flexible electrical conductors 28 pass through and are supported by the conductor supports 30.

The conductor supports 30 are floatingly mounted with respect to the disc 20, as elsewhere described.

However, if desired, the disc 20 may be the member which is floatingly supported and the conductor supports 30 may be relatively rigidly mounted if desired.

If desired, both the disc 20 and the supports 30 may be floatingly mounted.

The reading flexible electrical conductors or wires 28 having wiping contacts against the ribbon-like program electric conductors 24. For this reason, the conductors 28 carry a relatively light current and are used to energize members of a washing machine or the like which do not require a heavy current.

Figures 10, 11, 16, 17:
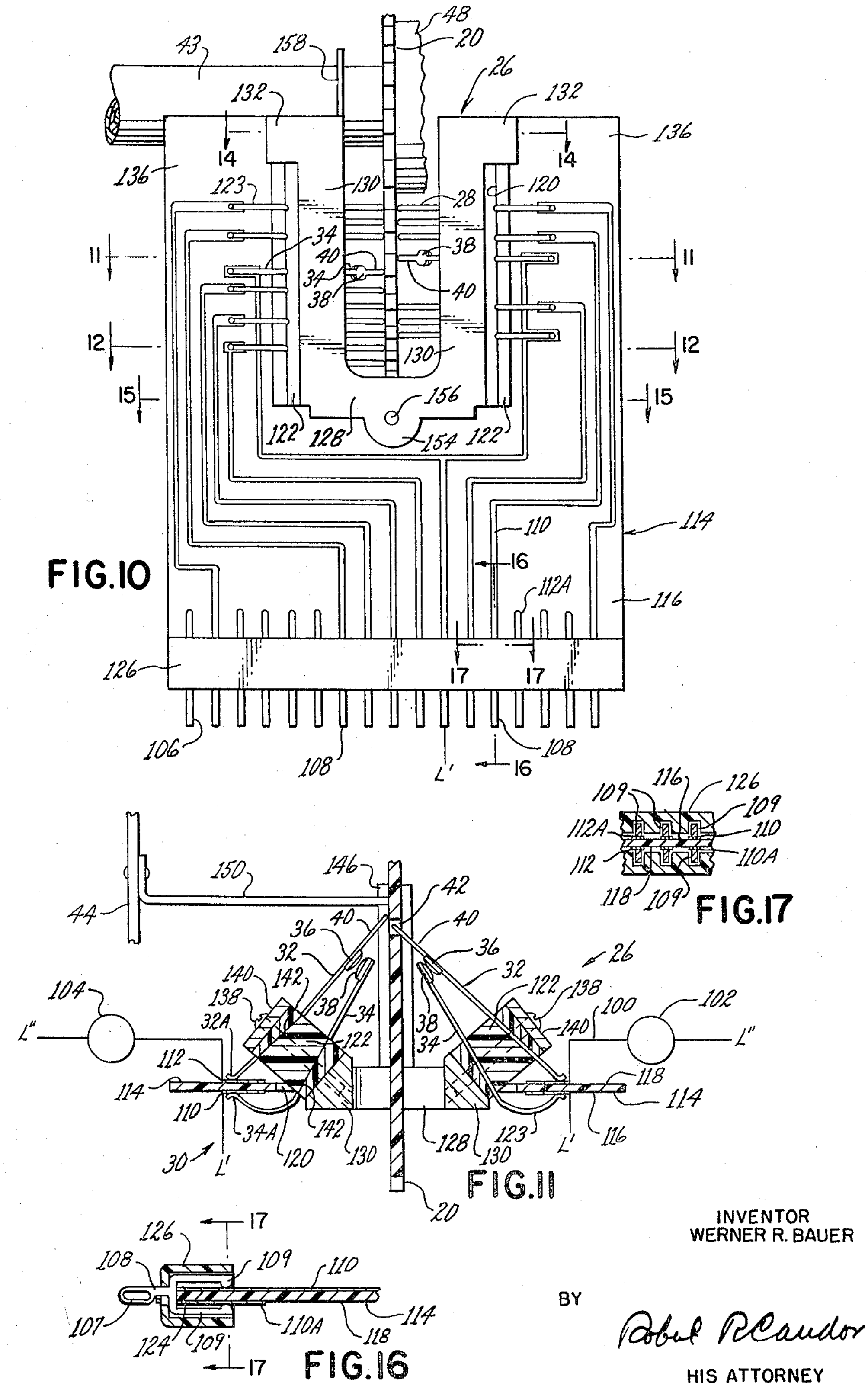
FIGURE 10 is an enlarged view of the reading member, and flat conductor plate, taken from plane 10—10 of FIGURE 3.
FIGURE 11 is a cross section along plane 11—11 of FIGURE 10.
FIGURE 16 is an enlarged cross section along plane 16—16 of FIGURE 10.
FIGURE 17 is a cross section along plane 17—17 of FIGURES 10 and 16.

Heavy current is carried by conductors 32 and 34, FIGURE 11. One or more pairs of these relatively movable electrical conductors 32 and 34 are biased toward each other and have electrical non-wiping contacts 36 and 38 abutting each other. One conductor 32 of each pair has has an extension 40 beyond the non-wiping contacts 36 and 38. An electrically insulated program irregularity or disc opening 42 on the disc or plate 20 engages the said extension 40 relatively to move the non-wiping contacts 36 and 38 toward and away from each other.

For example, the conductor 34 may be so held that the disc or plate 20 bends the conductor 40 upwardly, as shown on the left side of FIGURE 11. This causes the contact 36 to be lifted away from the contact 38 without wiping action so the heavy current circuit to motor 104 and governed by the conductors 32 and 34 is broken. When the extension 40 falls into the opening 42, then the contacts 36 and 38 are brought together to close the circuit, as shown on the right-hand side of FIGURE 11, to close the circuit to motor 102 or the like. The conductors 32 and 34 do not engage the ribbon-like program electrical conductors 24 on the sides of the disc and no electrical circuit is produced on the disc 20 by the conductors 32 and 34.

The disc or plate 20 is relatively movable with respect to the conductors 28, 32 and 34. For example, the disc 20 may be rotatable. The rotation may be made by quick, almost instantaneous steps, to produce quick make and break actions between the conductors 24 and 28.

To this end, a stationary sleeve 43 may be supported by the frame members 44 and 46 in any desired manner. The disc 20 may be rotatably mounted adjacent one end of the sleeve 43 in any suitable manner, such as by a bearing member 48, which bearing member may be secured to the disc 20 by means of the screws 50.

The bearing member 48 is fixedly secured to a long rotatable sleeve 49 which rotates inside the stationary sleeve 43. The bearing member is secured over the end 56 of sleeve 49.

An inner shaft 52 is slidably located within the long rotatable sleeve 49. When the shaft 52 is at a leftward or disengaged position, FIGURE 2, the sleeve 49, bearing 48 and disc 20 remain free of driving connection with shaft 52 and knob 60. When the shaft 52 is at rightward position, FIGURE 2, the sleeve 49, bearing 48, disc 20, shaft 52 and knob 60 are in clutched or engaged relationship and all rotate together. The clutch is indicated at 58.

A pointer 55 may be made rotatable with the disc 20 at all times since it may be secured to a ring 57. The ring 57 may be secured to the flange 59 of the rotatable sleeve 49 which is secured to the bearing 48 and disc 20 for simultaneous rotation. In this manner the pointer 55 can point to a program card or chart 61 which may be painted on or secured to the frame member 46.

Figure 4:
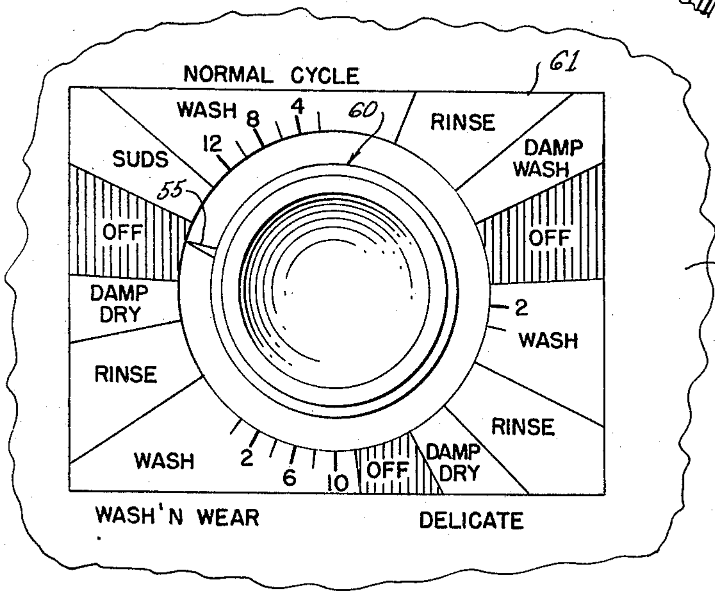
FIGURE 4 is an elevation taken from the plane 4—4 of FIGURES 1 and 2.

Several programs for washing clothes may be shown on the chart 61 as suggested in FIGURE 4. The printed programs on disc 20 may correspond to the programs on chart 61 and may stop the timer and the washing machine at the end of each program.

A sensing or locating construction for the axial movement of shaft 52 and knob 60 may be provided. This may include a ball race 63 which is inwardly urged by the compression springs 65 into the grooves 67 of shaft 52 to provide proper location to shaft 52. Plate 69 limits the leftward travel of shaft 52.

The inner shaft 52 is rotatably and axially movable inside of the sleeve 49 with a shaft and 54 extending beyond the sleeve end 56. The clutch 58 is effective between the shaft end 54 and the disc 20 and the bearing member 48 which is clutched and declutched by axial movement of the shaft 52.

Figures 2, 6, 7, 20:
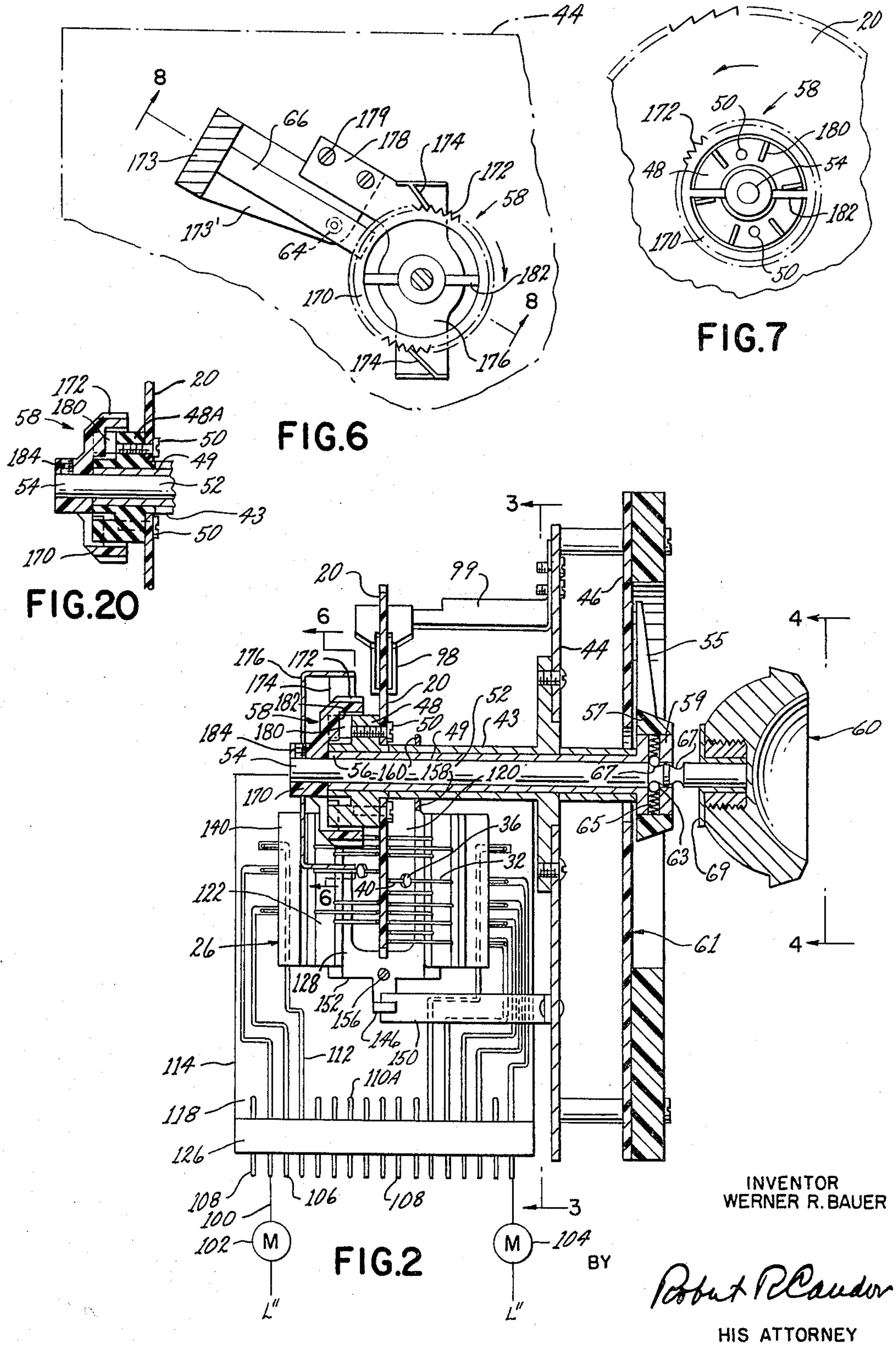
FIGURE 2 is a cross section along plane 2—2 of FIGURE 3, parallel to the plane of FIGURE 1.
FIGURE 6 is a cross section of certain clutch parts as seen from the line 6—6 of FIGURE 2 with certain parts omitted.
FIGURE 7 is an elevation taken along line 7—7 of FIGURE 1, with parts omitted.
FIGURE 20 shows an embodiment of a flexible floating support for the disc.

The manual means, or knob 60, axially and rotatably drives and is connected to the shaft 52, so that the knob 60 may be used and is clutch engaged with the disc 20 in the right axial position of the shaft, FIGURE 2, as when the knob 60 is pulled toward the user. The knob 60 may also be used for clutch disengagement between the shaft 52 and the disc 20 in another or left axial position of the shaft 52 when the knob 60 is pushed away from the user, such as leftward in FIGURE 2.

In view of this, when the knob 60 in FIGURE 2 is moved rightward and toward the user, the knob may be turned, and the disc 20 is caused also to be turned. On the other hand, when the knob 60 is moved leftward, the clutch 58 is disengaged, and the knob 60 is then freely turnable without turning the disc 20.

Power means, such as an electric synchronous motor 62, for example, may be provided to turn the disc 20. Means in the form of a switch 64 automatically energizes and deenergizes the power means or motor 62, under the control of knob 60. The printed circuit also controls the operation of the motor 62, as elsewhere described.

Figure 8:
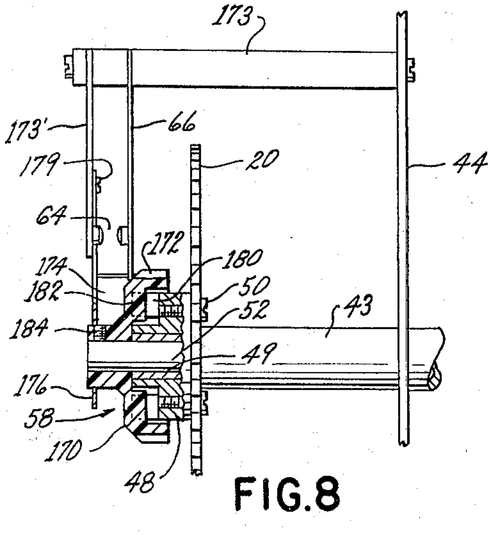
FIGURE 8 is a cross-section along plane 8—8 of FIGURE 6.
Figure 9:
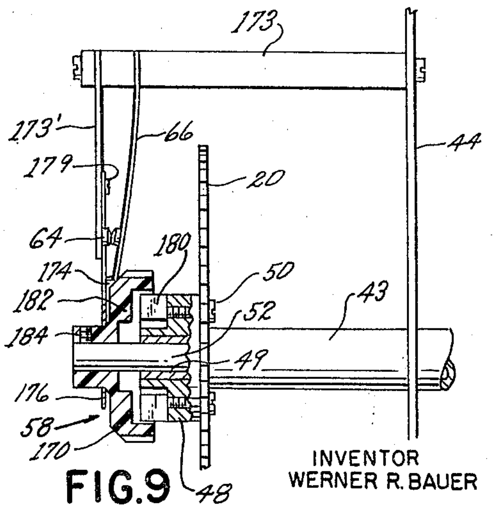
FIGURE 9 is a view of the parts shown in FIGURE 7 in declutched condition.

When the shaft 52 is moved to the disengaged axial position, such as the left position of FIGURE 2, the motor 62 is energized when the shaft 52 is moved to the leftward position in FIGURE 9 to close the switch 64 at a time when the clutch 58 is disengaged. On the other hand, when the shaft 52 is moved rightward, as shown in FIGURE 8, the switch 64 is opened by the outward bias of the switch blade 66 to stop operation of the motor 62 as well as operation of the timer.

Figures 3, 3A:
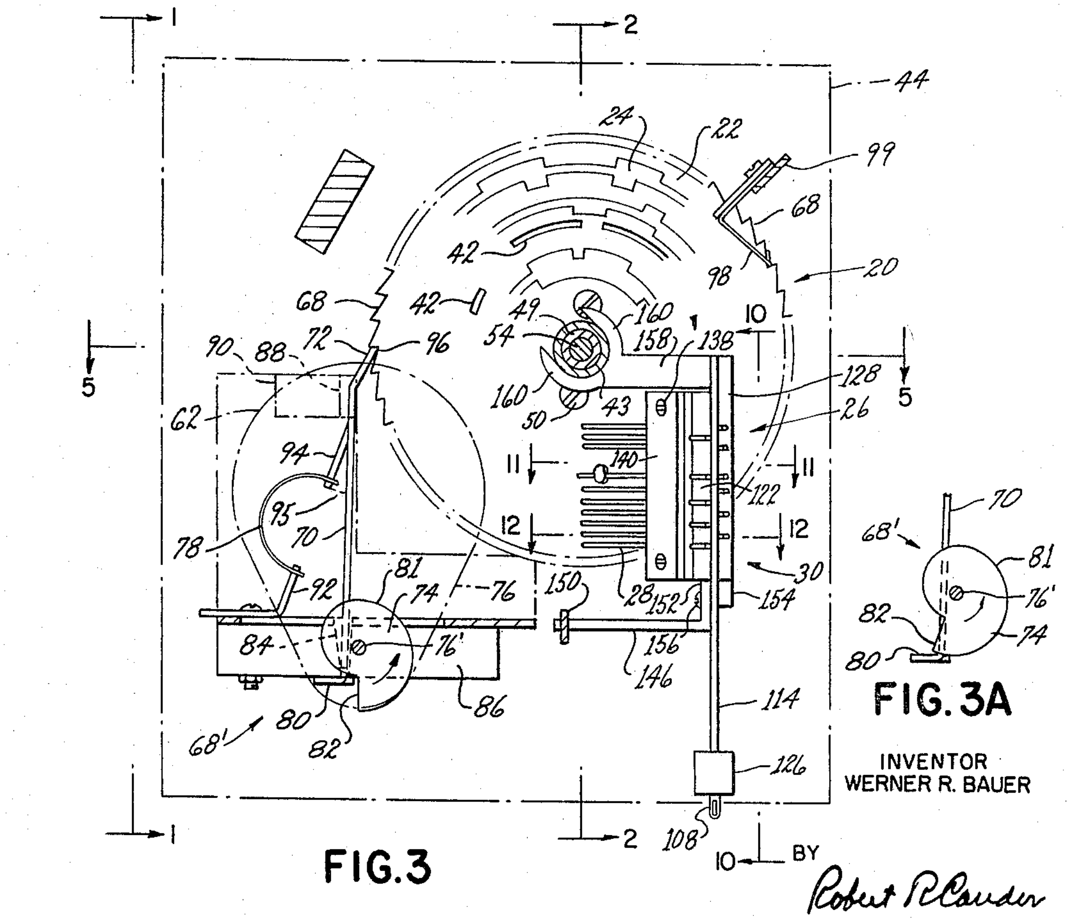
FIGURE 3 is a cross section transverse to, and taken along the plane 3—3 of FIGURES 1 and 2.
FIGURE 3A shows the stepping cam of FIGURE 3 in a different position.

The power means or motor 62 may turn the disc 20 in substantially instantaneous steps by ratchet tooth and pawl action, as indicated at 68' in FIGURES 1, 3 and 3A.

The program disc 20 may have ratchet teeth 68 at its periphery which are engaged by the pawl 70, which has a bent end 72 more readily to engage the teeth 68. The action is such that the pawl 70 moves or rotates the disc 20 one tooth length by a quick snap action, and this movement may be almost instantaneous, but it may occur only once in one or two minutes, which is an action made possible by the cam construction 74 shown in FIGURES 1, 3 and 3A.

The motor 62 drives the cam 74 by gear reduction 76, so that the cam 74 and cam shaft 76' rotate once every one or two minutes or any other interval of time desired.

A spring 78, which may be a C spring, is loadable or compressible while the pawl 70 moves slowly downward while being downwardly driven by slow curve or spiral 81. The pawl 70 then moves upwardly with an upward snap in tooth engaging direction in FIGURE 3, when the pawl is released by the radial drop surface 82 of cam 74. The cam 74, by counterclockwise rotation in FIGURE 3 engages the lower end 80 of the pawl 70 gradually to move the pawl 70 downward and to compress or load the spring 78, as shown in FIGURE 3A. When the cam 74 turns to the position where the sudden drop tooth or hill 82 passes or releases the bottom 80 of the pawl 70, an instant after the position of FIGURE 3A, then the fully loaded spring 78 pushes the pawl 70 upward, in FIGURE 3 position, with an instantaneous or snap action. This produces an almost instantaneous turn or step of the disc 20 for one tooth length.

The pawl 70 operates in a slit 84 in a nylon block 86, so the lower end of the pawl 70 is prevented from moving rightward or leftward in FIGURE 3. The upper end of the pawl 70 rides in a slot 88 in a nylon block 90.

The C spring 78 has one end held by the bracket 92 and the other end of the spring 78 engages a relatively solid flat rod 94 which is joined to the pawl 70, to give it a rightward bias in FIGURE 3, always to maintain the end 72 of the pawl in engagement with the tooth surfaces. The rightward bias which is given to the end 72, as indicated by the angle arc 95, is sufficient to produce a brake action which almost instantaneously stops the snap rotation of the disc 20. The rightward bias of the member 72 maintains it in the valley 96 of the tooth construction 68. The end 72 of the pawl 70 snaps over the hill of the tooth just before the cam 74 releases the pawl 70 upward. In other words, as the pawl 70 is pulled downward, the end 72 moves downwardly along the adjacent tooth 68, so that end 72 drops into the next lower valley 96 from that indicated in FIGURE 3.

The disc 20 is rotated clockwise in FIGURE 3, and a spring construction 98, FIGURES 2 and 3, engages the adjacent tooth 68, to prevent any counterclockwise movement of the disc. The spring construction 98 may be supported by bracket 99 from frame 44.

In this manner, the spring 78 is loadable to move the pawl 70 in tooth engaging direction and cam 74 gradually moves the pawl 70 in a tooth ratcheting direction or downward while loading the spring 78 and suddenly releases the pawl 70 for spring loaded quick or instantaneous movement of the disc 20, for one tooth length.

Because of this quick sudden one-tooth-length movement of the disc 20, the conductors 28 have their ends cleaned or jarred of any adhering particles, when these conductors 28 drop from the program electrical conductors 24 onto the insulated disc sides 22. Also a quick electrical make or break is made between the conductors 28 and 24 during the snap action.

Figures 12, 13:
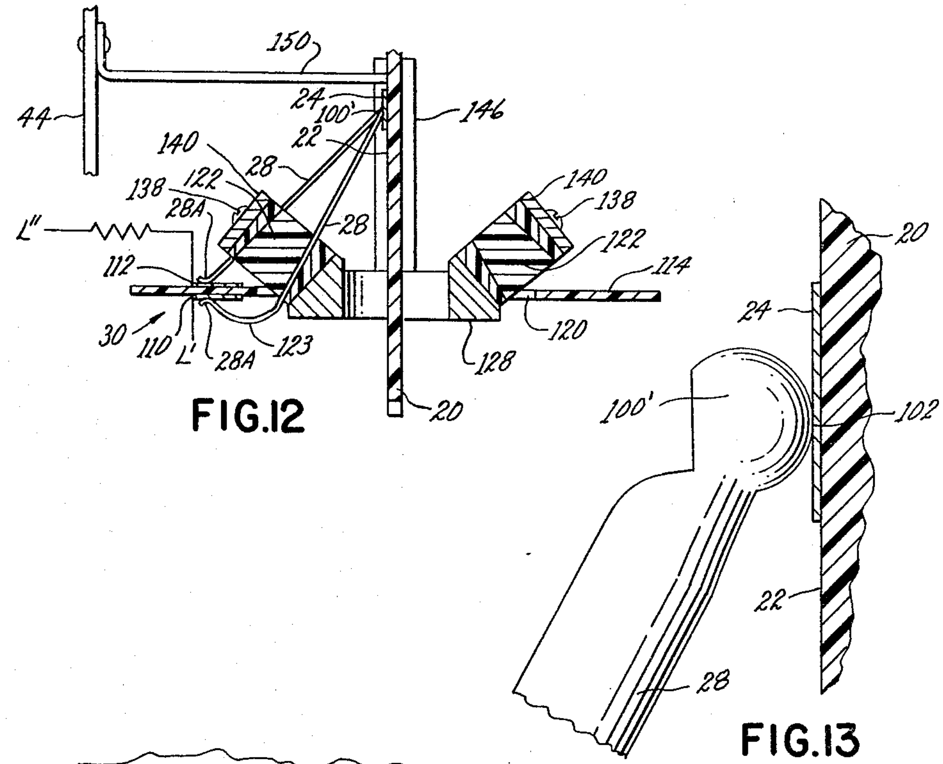
FIGURE 12 is a cross section along plane 12—12 of FIGURE 10.
FIGURE 13 is an enlarged view of the contact end of a reader wire contacting a program conductor.

The ends of the conductors 28 are given or formed into a spherical construction 100', FIGURE 13, to improve the effectiveness of the wiping contact at the contact point 102'.

The quick step produced by the cam action of cam 74 also helps to produce quick makes and breaks between the contacts 36 and 38 in FIGURE 11. The irregularities 42 in the disc 20, which may be long slots 42 in FIGURE 3, are so cut in the disc 20 that the extensions 40 are quickly lifted from or quickly dropped in the slots 42 at the very instant that the disc 20 is stepped or moved by the quick action of the pawl 70. This produces an instantaneous and non-wiping make and break between the contacts 36 and 38, which is capable of controlling a relatively heavy current, such as required by modern washing machine motors, and the like.

For example, contacts 36 and 38 are adapted to control a circuit 100 which may be connected to the washing machine main motor 102 or other high current device, such as indicated at 104, FIGURE 11.

On the other hand, the conductors 28 may control currents to the low current or small current devices such as valves, etc. which do not overload the wiping contacts at 102', FIGURE 13, between the conductors 28 and 24.

The quick intermittent steps of disc 20 are produced by the pawl 70 at the time that the high current contacts 36 and 38 are to be opened or closed.

Means may be provided to make available an orderly and easily connected set of lead line connectors 106 and 108, for connection with the lead lines for the devices to be controlled by the timer. Likewise, the lead line connectors 106 and 108 may be connected with efficient and easily perceived and traced connections to the conductors 28, 32 and 34.

To this end the program electrical conductors 24, and the high current conductors 32 and 34, may have their ends 28A, 32A and 34A curved as shown in FIGURES 11, 12, etc., and contacting the printed or similarly attached ribbon conductors 110, FIGURES 10 and 11, and ribbon conductors 112, FIGURES 2 and 11. The ribbon conductors may be printed or otherwise secured to a flat plate 114 which has insulated surfaces 116 and 118, in the same manner as on disc 20. The ribbon conductors 110 and 112 may be of any other shape desired, and may be stationary electrical conductors secured on the insulated surfaces 116 and 118.

The plate 114 may have a notch 120, FIGURES 2 and 10, to straddle portions of the flat program member or disc 20. Insulating contact supporting bars 122 are provided on the flat plate 114 on each side of the notch 120. These bars are part of the support 30. They may be made of plastic material, in wedge shaped sections, as shown. These contact supporting bars 122 carry the flexible conductors 28, 32 and 34 in a slanting manner, so that the disc engaging ends 40 and 100' of these conductors, FIGURES 11, 12 and 13, are slantingly directed toward the disc 20. These conductors 28, 32 and 34 pass through the insulating bars 122, and are then bent or so constructed at 123 that they are spring biased upwardly with their curved ends 28A, 36A and 38A contacting respective conductors 110 and 112 to produce a high capacity electrical contact at these places.

The ribbon or other shaped conductors 110 and 112 extend from the portions which contact the conductor ends 28A, 32A and 34A near the bars 122 and extend to the edge 124 of the plate 114.

An electrical connector bar 126 is secured around the edge 124 of the plate 114 as shown in FIGURES 2, 10, 16, and 17.

There are short balancing counterpart ribbons 110A, FIGURE 2 on the side 118 of the flat plate 114 which correspond to the ribbons 110 on the opposite side of the flat plate 114, as shown in FIGURE 17. Likewise, there are short counterbalancing ribbon conductors 112A on the surface 116 which are counterparts of the ribbon surfaces 112 on the surface 118.

Connectors 106 and 108 may be embedded in the bar 126, and each connector may have two prongs 109 which straddle the plate 114 and also the ribbon conductors 110, 110A, 108 and 108A.

The electrical connector bar 126 may be made of electrical insulating material, such as plastic material, in which the connectors 108 are embedded. The bar 126 and the connectors 108 are adapted to be telescoped over the edge 124 of the plate 114.

Because of the orderly arrangement of the connectors 106 and 108, suitable markings may be placed on the bar 126 to identify these connectors. Openings 107 may be provided to receive the lead wires which are to be connected to the connectors 106 and 108.

The connectors 106 and 108 and the conductors 110 and 112 may be easily traced, because of the orderly construction.

Figures 14, 15:
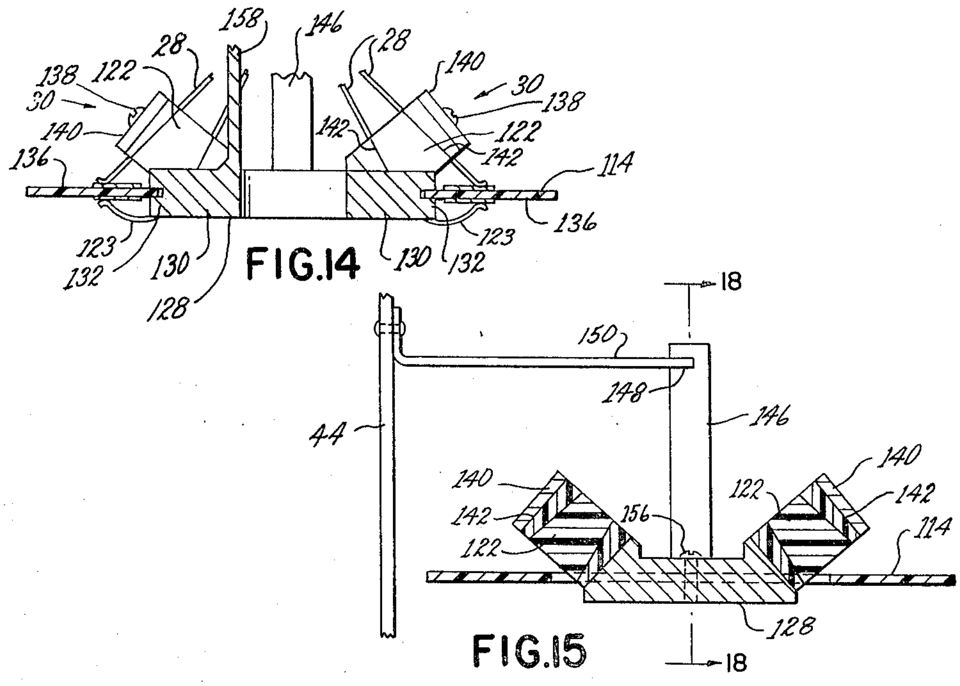
FIGURE 14 is a cross section of certain parts along plane 14—14 of FIGURE 10.
FIGURE 15 is a cross section of certain parts along plane 15—15 of FIGURE 10.
Figure 21:
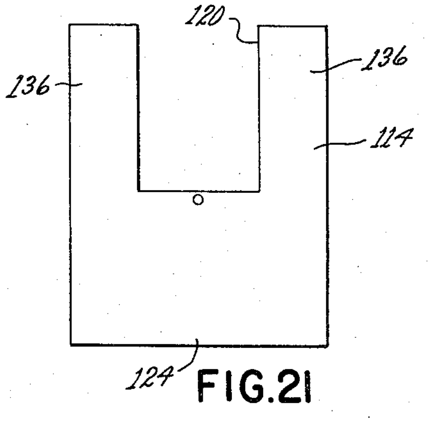
FIGURE 21 is an outline of the flat plate.

A metal U-shaped member 128 is secured to the plate 114 in any suitable manner. For example, the metal legs 130 of the U-shaped member 128 have outward extensions 132, FIGURES 10 and 14, which have notches 134 to straddle and be secured to the legs 136 of the plate 114.

The insulating contact supporting bars 122 may be secured to the legs 130 by means of the screw bolts 138, which pass through outside metal plates 140 to hold the bars 122 in place.

The bars 122 may be made of three wedge shaped pieces, as shown in FIGURES 11 and 12 which are joined together along the lines 142. The wires or conductors 28, 32 and 34 may pass through the bars 122 at these lines or surfaces 142 for easy assembling.

Figure 18:
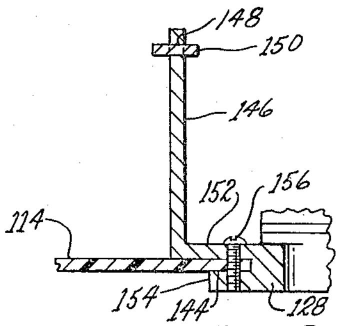
FIGURE 18 is a cross section along plane 18—18 of FIGURE 15.

The base of the metal U-shaped member 128 has a notch 144, FIGURE 18, which receives the main body of the plate 114 at the base of the U-shaped member 128. An integral bar 146 extends from the base 128 and has a notch 148 to receive the supporting bracket 150 which extends from the frame member 44.

The base 128 may have lips 152 and 154 to straddle the plate 114, as indicated in FIGURES 2, 3, 10 and 18.

A screw 156, FIGURES 2, 3, 10, 18, may pass through the member 128 and the member 114, to hold these two members together after they have been telescoped as a subassembly.

One of the legs 130 of the metal member 128 has a sleeve engaging support 158, FIGURES 2, 3, which has prongs 160 to straddle the sleeve construction 43. The legs 130 also hold the legs 136 of the plate 114, so that the flat plate 114 is indirectly connected and engages the sleeve 43 to provide a floating support for the reading electrical conductors 28, 32 and 34. Likewise the supporting bracket 150 and the bar 146 provide a floating support at the other end of the reader construction so that the reading conductors may effectively engage the disc 20 at all times.

The clutch 58, FIGURES 2 and 5–9 may include a cupped disc 170 which has teeth 172 which are engaged by tongues 174 of a stationary sheet metal member 176. The member 176 may have a bracket 178 which is supported on the rigid switch member 173' which is supported on another transverse stationary bracket 173 or the like. Screws 179 may be used for attachment to member 173'.

The tongues 174 prevent the clutch member 170 from turning in a counterclockwise direction in FIGURE 6.

The bearing member 48 has a series of radial flanges 180, FIGURES 2 and 7. These flanges 180 may be telescoped and drivingly interconnected with the flanges 182 of the cupped member 170. The flanges 180 and 182 are telescoped when the clutch member 58 is in an engaged position and they are disengaged when the cupped member 170 is moved leftward by a leftward movement of the shaft 54, since the cupped member 170 is secured by a screw 184 to the shaft 52.

In this manner the clutch 58 is engaged as in FIGURE 8, when the shaft and cup 170 are moved rightward to telescope the flanges 180 and 182 for driving connection. The clutch 58 is de-clutched or disengaged, as in FIGURE 9, when the cup 170 and shaft 52 are moved leftward sufficiently to untelescope the flanges 180 and 182.

The knob 60 may advance the disc 20 and the pointer 55 to any desired program setting whenever the knob 60 is pulled rightward. The tongues 174 and spring catch 98 and the pawl 70 are all directed along with the teeth 68 so that the knob 60 can rotate the disc 20 clockwise in FIGURE 3, but cannot rotate it counterclockwise. In view of this, any desired program or any stage of the program may be selected by rotation of knob 60.

Figure 19:
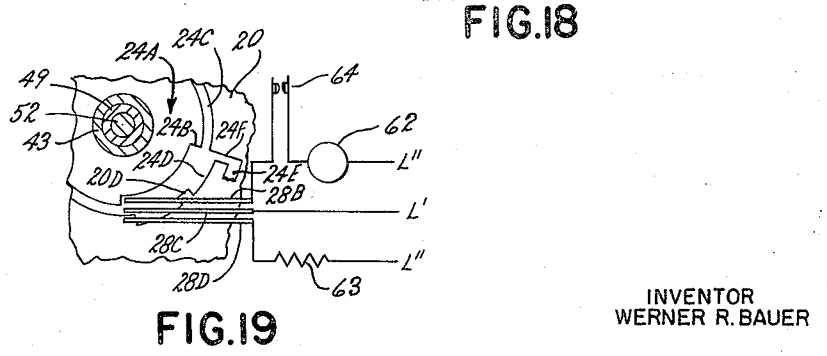
FIGURE 19 is a fragmentary showing of the control of the timer motor during a selected program.

FIGURE 19 shows a portion of the disc 20, and a sufficient number of reader conductors 28 to indicate how the timer motor 62 and an additional controlled member

63 may be electrically energized and deenergized during a selected program.

The thick arc-shaped conductor just below arrow 24A is a conductor construction on disc 20 which lies within a sector which controls a selected program. Only three of the reader conductors 28B, 28C and 28D are shown, and they are intended to be representative of the action which takes place as the disc 20 is advanced both manually and by the stepping action produced by timer motor 62.

FIGURE 19 shows disc 20 is a position representative of the start of the thick selected program. The disc 20 has been turned manually by knob 60 to the starting position of the selected program. During the manual turning movement motor switch 64 was open, as shown in FIGURE 8 and motor 62 was deenergized.

In FIGURE 19 the user is assumed ready to push knob 60 and shaft 52 to produce the positions shown in FIGURE 9 so shaft will be declutched and switch 64 closed.

The reader conductor 28B has just contacted the inner zone 24B of the arc 24A. The lead in conductor 28C has continuously contacted a more or less continuous lead in conductor belt 24C and such conductor 28 may also be connected to the lead in line L'.

When the switch 64 is closed, timer motor 62 is energized and proceeds to advance the disc 20 by means of pawl 70 and teeth 68, as indicated in FIGURE 3.

As the disc is stepped clockwise, the conductor zone 24D will contact reader conductor 28D to energize device 63, which may be any device on the washing machine or the like, such as a valve, agitator control, etc. The device 63 may be deenergized at a later stage when the vacant non-conductive notch 20D will break the circuit to device 63.

If desired, the lead in conductor 28C may connect the lead in line L' with other ribbon conductors 24E through the medium of a bridging conductor 24F. The conductors 24E may be used to energize other reading conductors 28, not shown in FIGURE 19, and also to energize other devices similar to 63, but not shown in FIGURE 19.

The selected program of FIGURE 19 may include one or more slots 42 which are shown in FIGURES 3 and 11 and may also include the conductors 32 and 34 and one or more of the heavy duty devices such as motor 102 and other heavy duty device 104.

The program of FIGURE 19 may therefore energize the timer motor 62, the one or more light current devices 63, the heavy current devices, such as motor 102, etc., at the desired periods of time in accordance with the conductor pattern on the surfaces of the program sector of disc 20, and also in accordance with the pattern of the slot or slots 42.

When the zone 24B is advanced to the end of zone 24B, the reader conductor 28B drops off the zone 24B on to the non-conductive surface of the disc 20. This deenergizes the timer motor 62 and stops the selected program. Generally all other timer controlled devices are deenergized at that time by proper configuration of the pattern on the disc. However, as is obvious, any device may be left in energized condition at the end of a selected program, if desired, by providing a conducting pattern to produce such energization.

Other lead-in wires 28 may be provided, in addition to lead-in wire 28C, for any other program or for any other part of the conductor pattern in the selected program shown in FIGURE 19.

Figure 5:
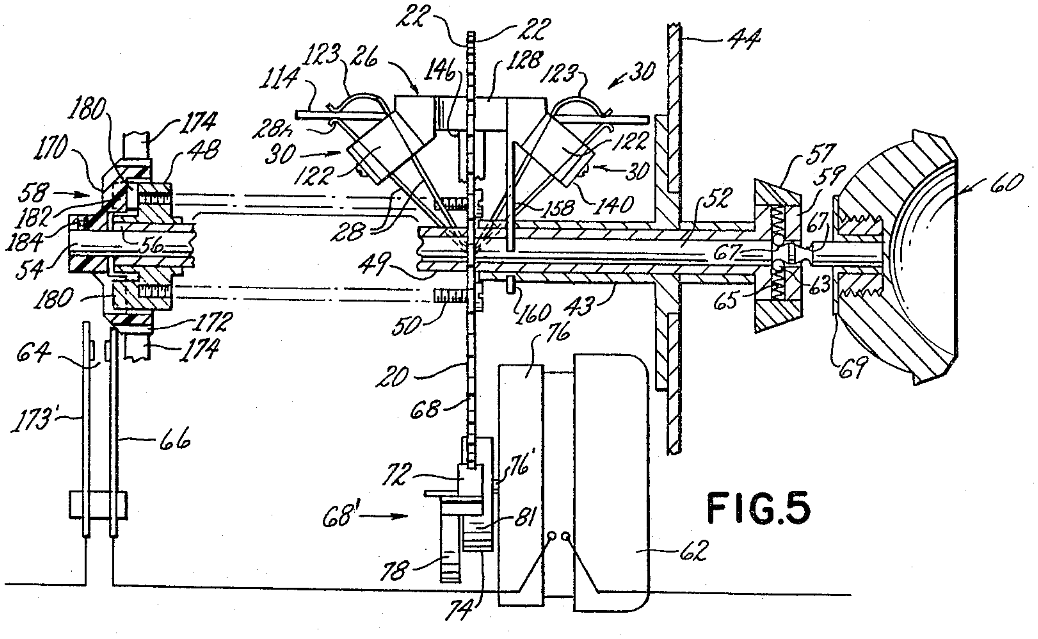
FIGURE 5 is a diagrammatic and partly exploded view of certain parts of FIGURE 3 taken from the plane 5—5 of FIGURE 3. The clutch parts are broken away and moved leftwardly to expose the conductor parts.

FIGURE 20 shows a hub construction 48A somewhat similar to the hub 48 of FIGURES 2, 5, etc. The hub 48A may be made of resilient material, such as rubber or the like. This hub floatingly supports the disc 20 on the shaft 43 so the disc 20 is floatingly mounted with respect to the conductor supports 30. The supports 30 may be rigidly or floatingly supported with the embodiment of FIGURE 20, as desired.

If desired, the spring 78 of FIGURE 3 may be made to have substantially the shape and construction of the spring 52 shown and described in the patent to W. E. Rhodes, No. 2,927,171, patented March 1, 1960. For example, FIGURE 4 of said patent is referred to as showing the shape of the spring in flat condition. The spring 52 of said patent is a constant stress, normally flat rolling spring. This type of spring, when applied as illustrated in FIGURE 3 of this application, produces a substantially constant push throughout the length of travel of one tooth length. This produces a sustained speed of rotation of the disc 20 during each step and produces a quick make and break between conductors 28 and 24 at the end of the printed circuits.

The spring 78, as shown in FIGURE 4 of the Rhodes patent is a C spring having a semicircular portion having a plan contour of varying width which decreases from a maximum at its center to a minimum at its end portions.

While the form of the invention now preferred has been disclosed, as required by statute, other forms may be used, all coming within the scope of the claims which follow.

What is claimed is:

1. In combination: a disc having non-conductive disc sides with program electrical conductors on said disc sides; and a U-shaped reader member with metallic legs straddling said disc; non-conductive bars held by said metallic legs; and flexible electrical conductors passing between said legs and through and supported by said non-conductive bars and being slantingly directed toward and biased into contact with said disc sides by said non-conductive bars.

2. In combination: a disc having non-conductive disc sides with program electrical conductors on said disc sides; and a U-shaped reader member with conductor supports of insulating material on both sides of said disc; and electrical conductors passing through and supported by said conductor supports and slantingly directed toward and biased into contact with said disc sides.

3. A combination according to claim 2 in which means are provided to floatingly mount said U-shaped reader member with respect to said disc.

4. A combination according to claim 2 in which means are provided to relatively floatingly mount said disc and U-shaped reader member with respect to each other.

5. A combination according to claim 2 in which means are provided to floatingly mount said disc with respect to said U-shaped reader member.

6. In combination: an intermittently rotatable plate having a non-conductive side with a plurality of program electrical conductors on said plate; a reader member with reading electrical conductors directed toward and biased against said plate side for wiping contact against said program electrical conductors; a pair of relatively movable electrical conductors biased toward each other and having electrical non-wiping contacts abutting each other with one conductor having an extension beyond said non-wiping contacts; an electrically insulated program irregularity on said plate and engaging said extension relatively to move said non-wiping contacts toward and away from each other, and means intermittently to rotate said plate by quick intermittent steps and during which quick intermittent steps said non-wiping contacts are moved toward and away from each other, and said program electrical conductors and said reading electrical conductors are connected to and disconnected from each other.

7. In combination: a program disc having program electrical contacts on its surface; reading conductors contacting said program electrical contacts with relatively low current capacity contact action; a pair of relatively movable conductors having relatively high current capacity contacts with each other; an irregularity on said disc causing a quick high current capacity contact movement between said high current capacity contacts; and means by which said disc is moved by quick intermittent steps and in which said high current capacity contact movement is produced during one of said quick intermittent steps and during which quick intermittent steps said program electrical contacts and reading conductors are separated from and connected to each other.

8. In combination: a flat program member having substantially parallel side surfaces with program electrical conductors on said surfaces; a flat plate having an electrically insulated surface and a notch to straddle portions of said program member; insulating contact supporting bars on said flat plate carried on each side of said notch; stationary electrical conductors secured on said insulated surface and extending from positions near said bars to an edge portion of said flat plate; flexible reading electrical conductors supported on said supporting bars with reading contact portions adjacent one end of said reading conductors engaging said program electrical conductors and with other contact portions engaging said stationary conductors adjacent said bars.

9. A combination according to claim 8 in which an electrical connector bar is secured to said edge portion of said plate having connector terminals with portions contacting said stationary electrical conductors and with other portions exposed for connection to lead wires.

10. A combination according to claim 9 in which said said flat plate has two electrically insulated surfaces with stationary electrical conductors on both said surfaces, and in which said stationary electrical conductors are connected to said terminals.

11. A combination according to claim 8 in which said flat program member is in the form of a disc rotatable about a transverse sleeve and in which said flat plate is connected to a sleeve engaging support secured to said sleeve.

12. A combination according to claim 11 in which said sleeve engaging support provides a floating support for said reading electrical conductors.

References Cited by the Examiner

UNITED STATES PATENTS

| | | | |
|---|---|---|---|
| 1,786,119 | 12/1930 | Lansing | 192—.02 |
| 2,208,831 | 7/1940 | Bassett | 74—125 |
| 2,664,948 | 1/1954 | Geoffrion | 200—37 X |
| 2,707,731 | 5/1955 | Backus | 200—37 |
| 2,779,445 | 1/1957 | Concord | 192—.02 |
| 2,917,933 | 12/1959 | Harris | 74—125 |
| 2,932,709 | 4/1960 | Budd et al. | 200—153.11 |
| 2,938,969 | 5/1960 | Gladden | 200—37 X |
| 2,966,974 | 1/1961 | Paskowski et al. | 192—67 |
| 3,053,947 | 9/1962 | Bowman et al. | 200—38.3 |
| 3,058,558 | 10/1962 | Hawk | 192—67 |
| 3,071,661 | 1/1963 | Porstorfer et al. | 200—37 |

BERNARD A. GILHEANY, *Primary Examiner.*

S. B. SMITH, H. M. SMITH, *Assistant Examiners.*